United States Patent Office 3,493,417
Patented Feb. 3, 1970

3,493,417
COMPOSITION FOR TREATMENT OF WOOD PRODUCTS COMPRISING A POLYOL COMPOUND, A POLYMERIZABLE AMINE FORMALDEHYDE RESIN AND A CURING CATALYST
Rolf Erhard Moren, Alfredshem, and Birger Sundin, Sundsvall, Sweden, assignors to Stockholms Superfosfat Fabriks Aktiebolag, Stockholm, Sweden, a limited company of Sweden
No Drawing. Filed June 7, 1966, Ser. No. 555,706
Claims priority, application Sweden, June 8, 1965, 7,513/65
Int. Cl. B44d 1/28
U.S. Cl. 117—65.2                           19 Claims

ABSTRACT OF THE DISCLOSURE

A method is provided for treating wood products having a flat surface to improve their surface hardness and durability and their dimensional stability and inhibit the development of checks and shakes by applying to a surface of the wood product a treating composition comprising a polyol compound and a polymerizable amine-formaldehyde resin and a curing catalyst for the resin, and then compressing the wood product in an open press under a pressure ranging from about 2 to about 50 kg/cm.$^2$ at a temperature ranging from about 90° C. to about 225° C. to cure the resin to a solvent-insoluble form, thereby forming a hard, durable surface on the wood product.

In addition, there are provided a treating composition for wood comprising a polyol compound, an amine-formaldehyde resin and a curing catalyst for the resin, and wood products treated with such composition.

---

The present invention relates to a method for treating wood products having a flat surface to increase their surface hardness and surface abrasion resistance while obtaining a smooth glossy appearance, retaining their natural surface appearance and reducing the tendency to develop checks and shakes, and to the improved wood products produced thereby. This invention also relates to a composition suitable for treating wood products having a flat surface according to the above method.

It is well known in the art to treat wood and wood products, such as plywood and laminated wood structures, fiber board, particle board and the like as well as freshly sawn wood planks with polyalkylene glycols and their ether and ester derivatives. Polyethylene glycols are especially preferred. This treatment prevents a warping of the wood during drying and seasoning and acts as an excellent dimensional stabilizer, retaining the original dimensions of the fresh wood before and after drying.

The effectiveness of these polyalkylene glycols and their derivatives is believed to be due to their compatibility with wood and water and to their high boiling point and vapor pressure, which is extremely low at ambient temperatures, up to 100° C. The polyalkylene glycols can then be soaked into the wood, replacing or mixing with the moisture therein, and will not evaporate from the wood body under even extreme ambient conditions. The glycols can be removed, however, by leaching with water or other solvents. Accordingly, in the case of wood which is to be used for outdoor purposes or in other circumstances where the humidity of the air varies from above the dew point to a low relative humidity, a portion of the glycol absorbed by the wood can be leached out and its dimensional stabilizing effect therefore lost.

The utilization of the various polyalkylene glycols or their derivatives for wood preservation has been described in British Patent No. 756,685 to Mo Och Domsjo AB issued Sept. 5, 1956. The patent describes the impregnation of wood with, for example, polyethylene glycol alone or combined with other additives for wood such as fungicides or bacteriocides.

In a paper presented at the British Wood Preserving Association, July 7–10, 1964, at Cambridge University, entitled "Some Practical Applications of Polyethylene Glycols for the Stabilization and Preservation of Wood" by Rolf E. Moren, the history of polyethylene glycol treatment of wood is set out with a résumé of the more common methods of applying the polyethylene glycol to wood. The usual methods of treatment disclosed are impregnation of wood products by immersion in a bath and surface treatment as by brushing, spraying or applying with a rolling machine, or a sprayer coater. In addition the impregnation can be achieved by a pressure vessel wherein the wood is immersed in a bath of polyethylene glycol which is then subjected to alternating vacuum and high pressures of up to about 10 kg./cm.$^2$. Moren also discloses that to prevent the loss of polyethylene glycol when the treated wood is contacted with water or other solvents for the glycol, a surface coating can be applied such as paint, lacquer or surface coating of a synthetic resin. The large polyethylene glycol molecules cannot permeate these skins and so will not be leached out. The best coating materials have been found to be the air drying synthetic lacquers based on polyurethane or melamine resins. A problem which has been found with these lacquers however is that the surface formed is not sufficiently hard or smooth. Heat curable synthetic resins have also been suggested for coating of wood surfaces and thereby a smoother surface is obtained, but the final heat treatment required for curing causes checks to appear in the surface of the wood products.

Various methods for the impregnation or treatment of wood or wood products with various polyols and other materials are set out by A. J. Stamm, e.g. "Dimensional Stabilization of Wood with Carbowaxes," Forest Products Journal 6, 1965:5, 201–204; "New and Better Means of Dimensionally Stabilizing Wood," Forest Products Journal 9, (1959):3, 107–110; "The Dimensional Stability of Wood," Forest Products Journal 9, (1959):10, 375–381. Stamm, in the article "New and Better Means of Dimensionally Stabilizing Wood," ibid, sets forth various chemical treatments for dimensionally stabilizing wood.

These methods, while apparently achieving some success, were not completely successful and the appearance of checks and shakes in the surface of the wood was not entirely prevented. Other processes suggested in the article for improving the dimensional stability of wood include cyanoethylation with acrylonitrile and reaction with beta-propionolactone.

In accordance with the present invention, it has been found that the disadvantages of the prior methods can be avoided by treating the surface of flat wood products with a treating composition comprising a polyol compound selected from the group consisting of polyols and the lower hydrocarbon esters and ethers thereof, a polymerizable amine-formaldehyde resin, and a hardener or curing catalyst for the resin.

The treating composition is applied to the surface of the wood product and the wood product is then subjected to compression in a heated open press at pressures within the range from about 2 to about 50 kg./cm.$^2$ and preferably from about 8 to 20 kg./cm.$^2$ and at a temperature sufficient to cure the resin within the range of from about 90° C. to about 225° C. and preferably from 120° C. to 145° C. The pressure can be applied in a hydraulic press under restraint, as is commonly used, for example, in forming plywood.

The invention is applicable to all types of wood, e.g. pine, birch, walnut, oak and spruce, heartwood and sapwood, in the natural green or dried state. All wood products with a flat surface, e.g. veneer, plywood, laminated wood, particle board, chip board, and fiberboard, can be treated in accordance with this invention. A few examples of wood applications, where the invention is of particular importance, are for the treatment of concrete shutterings, doors, and furniture.

The treating composition can be applied to moist wood prior to drying, in which case a secondary synergistic effect results whereby the drying process can be carried out considerably faster than with untreated wood or wood treated with each component separately. The composition can be applied to pre-dried wood, and/or wood surfaces pretreated with a polyalkylene glycol according to the above British patent.

In the preferred treating composition, the resin is in solution in the polyol compound. Where the amine-formaldehyde resin is only partly soluble in the polyol, or where the polyol is a solid, a solvent for the polyol and the resin can be added. Preferably, the polyol compound is water-soluble, and has a molecular weight of from about 100 to about 6000 and preferably from about 200 to 600. Solid polyols having a molecular weight up to 10,000, i.e. between about 10 and 10,000, can also be solvents for the resin if used at a temperature above their melting points. Additional solvents are desirably mixed with these heavier compounds if lower temperatures are used.

The present invention produces a wood product having a surface hardness and surface abrasion resistance sufficiently high to be useful as shutterings for concrete forms, wall surfaces and furniture surfaces, while preventing the appearance of checks and shakes, and preventing expansion or shrinking of the surface of the wood product. The wood product thus treated has an exceptionally smooth, hard surface, retaining the natural beauty of the wood grain.

Polyols suitable for use in the present invention include polyhydric alcohols having from two to six hydroxyl groups and even more preferably from two to three hydroxyl groups and from two to six carbon atoms, and the lower hydrocarbon ethers and esters thereof, the polyoxyalkylene glycols having from one to about 350 oxyether groups, and up to about 700 carbon atoms and the lower hydrocarbon ethers and carboxylic esters thereof.

The alkylene glycols and polyoxyalkylene glycols and their oxy-ethers and esters have the generic formula:

$$R_1O(C_nH_{2n}O)_mR_2$$

where $R_1$ and $R_2$ are the same or different, and can be hydrogen, or a lower hydrocarbon or lower hydrocarbonyl group having from one to about ten carbon atoms, $n$ is from one to about six, and $m$ is from one to about 350.

Among the compounds falling within the above group are glycerol, ethylene glycol, propylene glycol-1,2 and -1,3, butylene glycol-1,3, -1,3, -1,4, and -2,3, amylene glycol-1,2, -2,3, -1,3, -1,4 and -1,5, neopentyl glycol, diethylene glycol, dipropylene glycol-1,2, diamylene glycol-1,5, triethylene glycol, tripropylene glycol tetraethylene glycol, and the polyethylene glycols, polypropylene glycols, polybutylene glycols, and polyamylene glycols having a molecular weight of from about 100 to about 6,000. Suitable water-soluble polyol ethers are ethylene, propylene and butylene glycol ethers of aliphatic and aromatic alcohols in various degrees of polymerization, such as ethylene glycol monopropyl ether, ethyl ether of polyethylene glycol, the diethyl ether of ethylene glycol, the butyl ether and dibutyl ether of butylene glycol, the ethyl ether of ethylene glycol (Cellosolve), the butyl ether of ethylene glycol (butyl Cellosolve), the ethyl ether of butylene glycol, the propyl ether of ethylene glycol, the diethyl ether of ethylene glycol, the ethyl ether of propylene glycol, the methyl ether of ethylene acetate, the monoethyl ether of diethylene glycol (Carbitol), the monobutyl ether of diethylene glycol (butyl Carbitol), diethylene glycol monoethyl ether, diethylene glycol monobutyl ether, polypropylene glycol monomethyl ether and polyethylene glycol mono(octylphenyl) ether. Suitable water-soluble polyalcohol esters include diethylene glycol monoacetate, ethylene glycol monomethyl ether acetate, ethylene glycol monoethyl ether formate, ethylene diacetate, butylene-1,3 dipropionate, amylene-1,4 monocaproate, polyethylene glycol butyrate (M.W. of 600), the methyl ether of ethylene glycol butyrate, the propyl ether of butylene glycol acetate, polybutylene glycol di-propionate (M.W. 200), polypropylene glycol isobutyrate (M.W. 1000) and the propyl ether of polyproplyene glycol valerate (M.W. 600).

The polymerizable amine-formaldehyde resins useful in the compositions of the present invention are solvent-soluble and preferably water-soluble. They should have a viscosity sufficiently low to be flowable under the pressures applied during compression and setting of the resin. The term "amino-formaldehyde resin" includes any resinous polymer of an organic amine and formaldehyde.

The amine can be any lower amine having two or more amine groups, and these can have an amide character, as in urea and thiourea. Other amines include acrylamide, aniline, benzoguanamine, dicyandiamide, ethylene urea, and toluenesulfonamide. Mixtures of amines can also be used to form the amine formaldehyde resin.

Examples of resins are urea-formaldehyde and melamine-formaldehyde resins, as noted in the Modern Plastics Encyclopedia, volume 42, page 151.

The reactants are polymerized to a water-soluble or solvent-soluble (i.e. polyol-soluble, alcohol-soluble, or polyoxyalkylene glycol-soluble, or soluble in an ether or ester thereof) stage of polymerization, and the resin is applied in this condition. Further polymerization to a solvent-insoluble stage is effected in situ on the wood product.

Particularly suitable quick-setting amine-formaldehyde resins include the melamine-formaldehyde and urea-formaldehyde resins havin ga molar ratio of melamine or urea to formaldehyde of from about 1 to 1.5 to about 1 to 3 and preferably of 1 to 2 and a pH of from 7.5 to 10.5 and optimally from about 7.8 to 8 in aqueous solution, and a good flow.

The flow characteristic is defined as the amount of resin, expressed as a percent (%), that is forced out at a pressure of 70 kg./cm.$^2$ and at a temperature of 150° C. from a 1.5 mm thick laminated sheet of paper impregnated to a resin content of 67%, and dried to 5 to 8% volatile components. The pressure is applied for four minutes. The flow should be from 10% to 20% for the resins useful in the composition of this invention.

Suitable melamine-formaldehyde resins include Melurit M 120, Melurit M 130, and Melurit M 1072. A suitable urea-formaldehyde resin is Melurit K 100. A suitable mixed urea-melamine-formaldehyde resin is Melurit M 450.

The resins should also be tailored to have a relatively short setting time, preferably no more than 60 minutes and optimally from five to eighteen minutes at the usual curing temperatures of 120 to 150° C. and pressures of about 8 to 20 kg./cm.$^2$.

Hardeners or curing catalysts are added, usually in amounts up to about 1% by weight, to accelerate the rate of cure and ensure completion of cure of the amine-formaldehyde resins. These catalysts or curing agents are well known, and include acidic and latently acidic salts such as ammonium salts, zirconium salts and amine hydrohalids salts. Examples are ammonium chloride, sodium persulfate, ammonium rhodanide, magnesium chloride, zinc nitrate hexahydrate, zirconium oxychloride (ZrOCl$_2$), zinc tetrafluoroborate $Zn(BF_4)$, paraformaldehyde, ammonium phosphite, and $H_2ZrO_2$.

If a high molecular weight polyol, or derivative, is used which is not a suitable solvent for amine-formaldehyde resins or if the amine-formaldehyde resin or solution thereof in the polyol has too high a viscosity to have good flow, a solvent or dispersing medium for the polyol compound and for the resin can be added to facilitate penetration of the composition into the wood by lowering its viscosity. Suitable solvent or dispersing media include water and polar organic solvents, such as alcohols, e.g. methanol, ethanol, isopropanol, butanol and 2-ethylhexanol; esters, e.g. ethyl acetate, butyl acetate and amyl acetate; ketones, e.g. acetone, methyl ethyl ketone, methyl isobutyl ketone and diacetone alcohol Although water is a particularly effective viscosity regulating agent, it is usually desirable, when treating pre-dried wood, that the water content of the treating composition during the compression stage does not exceed 5% by weight of the treating composition, in order to prevent checks in the wood being treated. The amount of solvents other than water should not exceed 5%, although the chance of checking is less than with water. However, when treating moist wood, e.g. green veneer prior to drying, the treating composition can include a substantially higher water content, suitably from about 5 to about 45%

When a high proportion of water or other low viscosity solvent is used, the composition will have a low viscosity, and may not be readily or easily applied to the surface of the wood without dripping. To increase the viscosity of the composition, viscosity increasing additives can be added. Among the viscosity increasing additives suitable for use are the water-soluble cellulose ether derivatives having a viscosity of about 10 to 40,000 centipoises, and preferably from 1,000 to 10,000 centipoises, in a 2% aqueous solution. Examples of such viscosity-increasing materials include ethyl hydroxyethyl cellulose, methyl hydroxyethyl cellulose, sodium carboxymethyl cellulose (CMC), hydroxyethyl cellulose, hydroxypropyl cellulose, methyl cellulose, and ethyl hydroxypropyl cellulose.

The amount of viscosity-increasing additive included depends upon the desired viscosity and the solvent used. A suitable combination of solvents and viscosity-increasing agents can be mixed into the compositions of the invention to obtain a treating composition of any desired viscosity.

The proportion of amine-formaldehyde resin to polyol is usually within the range of from about 40 to about 80 parts by weight of the resin and 60 to 20 parts by weight of the polyol. Preferred compositions contain from about 45 to 55 parts by weight of the resin and 55 to 45 parts by weight of the polyol. For special purposes, wood can be treated with compositions having a greater or lesser proportion of the resin. It should be noted, however, that the higher the proportion of the resin, the greater the hardness as well as the brittleness of the surface of the treated wood, and the greater the tendency to check. Thus, generally, the proportion of amine-formaldehyde resin does not exceed 100 parts and is not below about 20 parts for each 70 to 10 parts of polyol.

By mixing different polyols, special effects and properties can be obtained, such as a high gloss, improved release from the hydraulic press, improved surface smoothness and resistance to fiber raising. In order to obtain a satisfactorily smooth surface for general use, it is desirable to apply at least about 200 g./m.² of the treating composition to the wood. A significant improvement in these properties is noted when as little as 50 g./m.² is applied. There is no upper limit on the amount, since this depends upon the desired thickness of the coating. Normally, however, it is not necessary to apply more than 400 g./m.². For extreme outdoor conditions in a very rainy climate alternating with extremely dry period, at least about 200 g./m.² of treating composition should be applied. Similarly, when the wood is to be used as shutterings, or for concrete molds, the higher proportions should be used.

In carrying out the process of this invention, the top surface layer of the wood, e.g. the top veneer layer of plywood or other laminated wood product, can be and preferably is pre-dried to a moisture content of below about 25% and preferably below about 10%. The drying step can be followed optionally by pretreatment with a polyol alone preferably a polyalkylene glycol. If the surface is impregnated with the polyol, the pre-drying of the wood may be superfluous. A green or moist wood product thus can be first impregnated with the polyalkylene glycol, dried, and then treated according to this invention. In this case, the wood product is surface-impregnated e.g. impregnating the top ply of a plywood or laminated wood product with a polyethylene glycol or other polyalkylene glycol having a molecular weight of between 400 and 1500. The treated wood surface should contain about 10 to 30% of absorbed polymeric polyol calculated on a dry wood basis. The polyol applied is preferably in a substantially pure form.

Other additives can be mixed with the treating composition of this invention, or with the polyalkylene glycol used in pretreatment. Fungicides such as sodium pentachlorophenate, boric acid, borax and organotin compounds are especially useful. Other materials which can be added include insecticides, fireproofing agents, pigments, dyes and release agents.

A storable form of the treating composition of this invention contains the resin and the polyol compound plus any solvents, solubility improvers, viscosity increasers and any of the other additives listed in the preceding paragraph. The hardener is usually not added until immediately before the application onto the surface of the wood product or immediately thereafter, i.e. just before compressing and curing are carried out.

The wood products produced according to the process of this invention have considerably impdoved properties as compared to untreated wood or wood treated by any of the prior art methods, such as first treating with a glycol and then subsequently forming a surface coating thereon with a resin. The dimensional stability of the surface is improved, as is the resistance of the wood to deterioration and loss of dimensional stability due to external conditions. Similarly, the surface of the wood has a greater hardness and abrasion resistance which resists the fiber-raising on the surface that often occurs when wood is wetted, as in shutterings for concrete molds. This problem has long been a plague to builders with concrete. The improved surface properties also result in extraordinarily good release characteristics from the molds.

The precise mechanism by which the particular combination of materials react and why the temperature and pressure conditions under which they react produce the excellent results achieved with this invention cannot be explained. The improved effect is possibly due in part to the greater penetration of the resin into the wood as a result of its being dissolved in the polyol compound, and also in part due to simultaneous interactions among all three components that cannot take place when only two are together at a time.

The treating composition, as well as the polyol pretreatment, can be applied to the wood by dipping, immersing, rolling, brushing or spraying.

When pretreating the wood with the glycol alone, preferably the top ply of a multi-ply or laminated wood structure is immersed, dipped or passed through the glycol material after being turned but prior to being glued together to form the plywood or laminate. The top ply is preferably in a green or undried state. Otherwise, the glycol can be applied to the surface of a solid wood structure and then dried prior to applying the resin glycol mixture of this invention.

The products formed according to this invention are especially useful as shutterings for concrete castings.

When used for this purpose a further improvement in the release can be obtained by applying a top layer of polyurethane resin.

The following Examples describe preferred embodiments of this invention:

EXAMPLE 1

Test sheets were prepared of size 500 x 500 x 12 mm. of factory-made pine plywood, built up of 5 veneer plies, of which the outer ply in raw condition after turning but prior to gluing together in the plywood had been impregnated by immersion in 100% polyethylene glycol, molecular weight 400, to an absorbed quantity of polyethylene glycol of 20%, calculated on the dry wood, and then dried in a veneer drier. The polyethylene glycol-impregnated plywood laminate was then treated with a viscous solution comprising the following ingredients:

| | Percent by wt. |
|---|---|
| Polyethylene glycol, molecular wt. 400 | 54 |
| Spray dried melamine-formaldehyde resin (melamine to formaldehyde ratio 1:2) (Melurit M 130) | 40 |
| Ethylhydroxyethyl-cellulose (Modocoll E 600) (Brookfield viscosity at 20° C. and 2% concentration 2000 to 3000 centipoises) (Bulk density 400–600 g./l., Particle size passing mesh screen 35–98%) | 0.5 |
| Ammonium rhodanide (hardener) | 0.5 |
| Water | 5 |

The above solution was applied at a level of 280 g./m.$^2$ with a brush to the test sheets which were then inserted in an open hydraulic press of the type used in the plywood industry for gluing veneer to plywood and subjected to compression at a temperature of 135° C. and a pressure of 12 kg./cm.$^2$ for 15 minutes until the resin was cured. The test sheets were held in the press for another 8 minutes to cool to a temperature of 30° C.

The test sheets had an exceptionally smooth surface which retained the natural structure and color of the wood and were completely free from checks and shakes. The terms "check" and "shake" are defined and illustrated at pages 10, 11 and 19 of the reference text "Guiding Principles for Grading of Swedish Sawn Timber for Export," by the Swedish Timber Grading Committee of 1958, English edition, published by AB Svensk Trävaru-Tidning (the Swedish Timber and Wood Pulp Journal), Stockholm, Sweden, 1962.

The abrasion resistance of the smooth, hard surface of the treated wood was determined in a Taber Abraser grinding machine with sandpaper of quality S-33 NEMA at 50, 100 and 200 r.p.m., respectively. The average weight of the particles removed by the abrasion was determined and converted to an average figure based on an average rate of 100 r.p.m. The more particles abraded, the lower the abrasion resistance. The weights obtained are shown in Table I below. Table I also shows the results of the same test taken on the untreated veneer sheets, and on sheets treated with the polyethylene glycol or with the melamine-formaldehyde resin alone.

Table I

| | Abrasion resistance |
|---|---|
| Untreated sheet | 165 |
| Polyethylene glycol treated sheet | 165 |
| Melamine resin treated sheet | 108 |
| Polyethylene glycol and melamine resin treated sheet | 110 |

The surface hardness of the test sheets was also determined with a Sward hardness rocket; a glossy surface representing the reference substance has a surface hardness defined as 100. The results of the hardness test on the sheets treated according to this invention are set forth in Table II, below, along with the results for a sheet treated only with the glycol, and for a sheet having a surface coating of a commercial high-quality polyurethane lacquer.

Table II

| | Surface hardness |
|---|---|
| Polyurethane lacquer treated sheet | 34 |
| Polyethylene glycol treated sheet | 15 |
| Polyethylene glycol melamineformaldehyde resin treated sheet | 60 |

The above data show that treatment with the polyol does not impair the abrasion resistance of either the untreated wood, as compared to one which is treated only with polyol or a melamine-formaldehyde resin treated sheet as compared to one treated with the invention combination of polyol and melamine-formaldehyde resin. The treatment of this invention is shown to substantially improve the abrasion resistance of the veneer.

Similarly, as shown, the resin/polyol treating composition of the present invention increased the surface hardness of a wood sheet by a factor of 4 as compared with a sheet treated by glycol alone and showed a hardness twice that of a sheet treated with a commercial high-class lacquer (polyurethane resin lacquer).

When the water content of the treating composition was increased to 30% and 40% respectively, checking occurred in the surface of the test sheet immediately upon removal from the press.

EXAMPLE 2

Sheets identical with those in Example I were prepared in the same manner as described in Example 1 and impregnated with the same amount of a treating solution having the following formulation:

| | Percent by wt. |
|---|---|
| Polyethylene glycol, 70% molecular weight 1500 | 40 |
| Melamine-formaldehyde resin (Melurit M 130) | 59.5 |
| Ammonium rhodanide (hardener) | 0.5 |

The above composition was melted at a temperature of about 50° C. after which a homogeneous solution was formed and applied to the test sheets by means of rollers in an amount of 200 g./m.$^2$. The sheets were then placed in an open hydraulic press and compressed at 130° C. as set forth in Example 1.

The same tests as in Example 1 were made. The test sheets treated showed an excellent smooth, glossy surface without checks or shakes. The Sward test showed a hardness of 70.

EXAMPLE 3

Test sheets of five-ply birch plywood, 2000 x 1000 x 12 mm. were prepared as in Example 1. The outlet ply had been impregnated in the raw condition after turning but prior to gluing with a 60% polyethylene glycol, molecular weight 1500. The amount of polyethylene glycol absorbed into the wood was 20% by weight, based on the dry wood. The outer ply of veneer was then dried in a veneer drier and the remaining four plies glued together to it under pressure in the usual manner. The test sheets were treated with a solution having the following formulation:

| | Percent by wt. |
|---|---|
| Polyethylene glycol, molecular weight 400 | 30 |
| Melamine-formaldehyde resin (Melurit M 130) | 50 |
| Ammonium rhodanide (hardener) | 0.5 |
| Ethanol, 96% | 19.5 |

The solution was spread on the test sheets with a brush at a level of 300 g./m.$^2$. The test sheets were placed in an open hydraulic press and compressed at a temperature of 130° C. and a pressure of 10 kg./cm.$^2$ for about 20 minutes to cure the resin. The test sheets treated as above exhibited a very smooth surface, entirely free from checks and shakes, and particularly suitable for the manufacture of table tops. The hardness and the abrasion resistance of these materials were found to be about equal to the preceding examples.

EXAMPLE 4

The procedures of Examples 1 and 2 were repeated treating the test sheets described therein with a solution having the following formulation:

| | Percent by wt. |
|---|---|
| Dibutylene glycol | 39 |
| Melamine-formaldehyde resin (Melurit M 130) | 60 |
| Hydroxyethyl cellulose (Tylose H 300) | 0.5 |
| Ammonium rhodanide (hardener) | 0.5 |

The above composition was spread on the test sheets with a brush in an amount of 300 g./m.$^2$, and inserted in an open hydraulic press and compressed for 20 minutes at 100° C. at 18 kg./cm.$^2$ pressure.

The sheets were tested as in Examples 1 and 2 and were found to have an excellent smooth, hard surface without checking. The natural grain of the wood showed and the hardness and abrasion resistance were suitably improved.

EXAMPLES 5 TO 8

The test procedures of Example 4 were repeated using treating compositions of the following formulation under the following process conditions:

EXAMPLE 5

| | |
|---|---|
| Polypropylene glycol, molecular weight 400 percent by weight | 50 |
| Urea formaldehyde resin (molar ratio of urea to formaldehyde of 1:2) percent by weight | 49 |
| Ammonium chloride (hardener) do | 1 |
| Amount spread on wood (birchwood) g./m.$^2$ | 275 |
| Press conditions: | |
| Temperture ° C | 125 |
| Time minutes | 10 |
| Pressure kg./cm.$^2$ | 12 |

EXAMPLE 6

| | |
|---|---|
| Glycerol percent by weight | 40 |
| Melamine formaldehyde resin (Melurit M 130) percent by weight | 55 |
| Ethyl hydroxyethyl cellulose (Modocoll E 600) percent by weight | 0.5 |
| Ammonium rhodanide (hardener) do | 0.5 |
| Water do | 4 |
| Amount spread on wood (beech wood) g./m.$^2$ | 325 |
| Press conditions: | |
| Temperature ° C | 130 |
| Time minutes | 8 |
| Pressure kg./cm.$^2$ | 15 |

EXAMPLE 7

| | |
|---|---|
| Ethyl monoether of polyethylene glycol molecular weight 600 percent by weight | 35 |
| Melamine formaldehyde resin (Melurit M 130) percent by weight | 61 |
| Ammonium rhodanide (hardener) do | 0.5 |
| Water do | 3.5 |
| Amount spread on wood g./m.$^2$ | 205 |
| Press conditions: | |
| Temperature ° C | 120 |
| Time minutes | 12 |
| Pressure kg./cm.$^2$ | 15 |

EXAMPLE 8

| | |
|---|---|
| Methyl ether of diethylene glycol butyrate percent by weight | 35 |
| Urea-formaldehyde resin (molar ratio urea to formaldehyde 1:1.7) percent by weight | 62 |
| Ethyl hydroxyethyl cellulose (Modocoll E 600) percent by weight | 0.5 |
| Ammonium rhodanide (hardener) do | 0.5 |
| Ethanol do | 2 |
| Amount spread on wood g./m.$^2$ | 230 |

| Press conditions: | |
|---|---|
| Temperature ° C | 115 |
| Time minutes | 14 |
| Pressure kg./cm.$^2$ | 12 |

Examples 5 through 8 were all tested as set forth in Example 1, and were found to have excellent smooth, hard surfaces without checks and shakes, and a substantially improved surface hardness and abrasion resistance.

EXAMPLE 9

Freshly cut plies of 1.6 mm. pine veneer having a moisture quotient of 80% were treated prior to drying with a composition comprising the following ingredients:

| | Percent |
|---|---|
| Polypropylene glycol, molecular weight 1500 | 20 |
| Polyethylene glycol, molecular weight 400 | 20 |
| Urea-formaldehyde resin (Melurit KL 67) | 35 |
| Ammonium rhodanide (hardener) | 0.5 |
| Water | 24.5 |

The plies were dried in a veneer drier at a temperature of 120° C. for ten minutes. The quantity of absorbed composition amounted to 35% calculated on dry veneer. The veneer plies treated were then glued to form surface veneer of laminated wood by means of a melamine resin glue and subjected to a pressure of 8 kg./cm.$^2$ at a temperature of 125° C. in a seizing press. After pressing the products were trimmed. The treated products had a very hard and smooth surface without showing any tendency for checking. After storing for 3 months outdoors the laminated wood prepared according to the present invention exhibited a considerably reduced yellowing of the surface layer compared to untreated samples stored under identical conditions.

Having regard to the foregoing disclosure, the following is claimed as the inventive and patentable embodiments thereof:

1. A method for treating wood products having a flat surface to improve their surface hardness and durability and their dimensional stability and inhibit the development of checks and shakes, which comprises applying to a surface of the wood product an amount of not less than 200 g./m$^2$ of a treating composition comprising from about 20 to about 60 parts by weight of a polyol compound having a molecular weight within the range from about 100 to about 10,000 and selected from the group consisting of polyhydric alcohols having from two to six hydroxyl groups and from two to six carbon atoms, and the lower hydrocarbon ethers and esters thereof, and polyoxyalkylene glycols having from one to about 350 oxyether groups and up to about 700 carbon atoms and the lower hydrocarbon ethers and esters thereof; and from about 40 to about 80 parts by weight of a solvent-soluble incompletely polymerized amine-formaldehyde resin, polymerizable to a solvent-insoluble state, and a curing catalyst for the resin; and then compressing the wood product in an open press under a pressure within the range from about 2 to about 50 kg./cm.$^2$ at a temperature within the range from about 90° C. to about 225° C. to cure the resin to a solvent-insoluble form thereby forming a hard, durable surface on the wood product.

2. A method according to claim 1 wherein the composition is a solution of the resin in the polyol compound.

3. A method according to claim 1 wherein the composition includes a solvent selected from the group consisting of water, the lower alkanols and the lower alkyl ether and ester derivatives thereof.

4. A method according to claim 1 wherein the product is surface-impregnated with a polyethylene glycol having a molecular weight within the range of from about 200 to about 15,000 prior to application of the treating composition.

5. A method according to claim 1 wherein the polyol compound has the formula $R_1O(C_nH_{2n}O)_mR_2$ wherein $R_1$ and $R_2$ are selected from the group consisting of hydrogen, lower hydrocarbon and lower hydrocarbonyl groups having from one to about ten carbon atoms, $n$ is from one to about six and $m$ is from 1 to about 350.

6. A method according to claim 5 wherein the polyol compound has a molecular weight in the range of from about 200 to about 600 and is water-soluble.

7. A method according to claim 1 wherein the wood product is selected from the group consisting of dried or green wood in the form of plywood, veneer, fiberboard and particle board.

8. A method according to claim 1 wherein the amine-formaldehyde resin has a flow of from about 10 to about 20%; said flow is the amount of resin, expressed as a percent (%), that is forced out at a pressure of 70 kg./cm.$^2$ applied for four minutes and at a temperature of 150° C. from a 1.5 mm. thick laminated sheet of paper impregnated to a resin content of 67%, and dried to 5 to 8% volatile components.

9. A method according to claim 1 wherein the treating composition also includes a cellulose ether having a viscosity of from about 10 to about 40,000 centipoises.

10. A treating composition for wood comprising from about 20 to about 60 parts by weight of a polyol compound having a molecular weight within the range from about 100 to about 10,000 and selected from the group consisting of polyhydric alcohols having from two to six hydroxyl groups and from two to six carbon atoms, and the lower hydrocarbon ethers and esters thereof, and polyoxyalkylene glycols having from one to about 350 oxyether groups and up to about 700 carbon atoms and the lower hydrocarbon ethers and esters thereof; and from about 40 to about 80 parts by weight of a solvent-soluble incompletely polymerized amine-formaldehyde resin, polymerizable to a solvent-insoluble state, and a curing catalyst for the resin, the composition being curable under pressure and temperature on the surface of the wood product treated therewith to form a hard, durable surface on the wood product.

11. A composition according to claim 10 wherein the composition is a solution of the resin in the polyol compound.

12. A composition according to claim 10 wherein the composition includes a solvent selected from the group consisting of water, the lower alkanols and the lower alkyl ether and ester derivatives thereof.

13. A composition according to claim 10 wherein the polyol compound has the formula $R_1O(C_nH_{2n}O)_mR_2$ wherein $R_1$ and $R_2$ are selected from the group consisting of hydrogen, lower hydrocarbon and lower hydrocarbonyl groups having from one to about ten carbon atoms, $n$ is from one to about six and $m$ is from 1 to about 350.

14. A composition according to claim 13 wherein the polyol compound has a molecular weight in the range of from about 200 to about 600 and is water-soluble.

15. A composition according to claim 10 wherein the amine-formaldehyde resin has a flow of from about 10 to about 20%; said flow is the amount of resin, expressed as a percent (%), that is forced out at a pressure of 70 kg./cm.$^2$ applied for four minutes and at a temperature of 150° C. from a 1.5 mm. thick laminated sheet of paper impregnated to a resin content of 67%, and dried to 5 to 8% volatile components.

16. A composition according to claim 9 wherein the treating composition also includes a cellulose ether having a viscosity of from about 10 to about 40,000 centipoises.

17. A wood product having a hard, durable surface and improved dimensional stability and resistance to deterioration surfaced with treating composition of claim 10 which has been cured.

18. A wood product in accordance with claim 17 in which the resin is a melamine-formaldehyde resin.

19. A wood product in accordance with claim 17 in which the polyol is a polyoxyalkylene glycol.

References Cited

UNITED STATES PATENTS

| | | | |
|---|---|---|---|
| 2,270,180 | 1/1942 | Bass et al. | 260—15 |
| 2,370,517 | 2/1945 | Bass et al. | 260—15 |
| 2,632,715 | 3/1953 | Nadeau et al. | 260—15 |
| 2,672,427 | 3/1954 | Bauling et al. | 260—15 |
| 3,093,600 | 6/1963 | Spencer et al. | 260—29.4 |
| 2,416,721 | 3/1947 | Upson | 117—65.2 |
| 3,193,441 | 7/1965 | Schafer | 117—65.2 |
| 3,037,951 | 6/1962 | Basto et al. | 117—137 |

FOREIGN PATENTS 876,830  9/1961  Great Britain.

OTHER REFERENCES

Pacific Plastics, vol. 2, No. 1—January 1944, "New Horizons For Wood," pp. 14–15.

Chem. Abst. 64: 19973g, Gillwald et al.

Chem. Abst. 63: 5892f, "Wood Impregnation," Moren.

Chem. Abst. 65: 15660f, "Wood Impregnation with Polyalcohol Ethers or Esters," Mo Och Domsjo Aktiebolag.

Forest Products Jounal; vol. 17, No. 2, 1967.

HUG: "Wood Preservation: Past, Present, and Future."

WILLIAM H. SHORT, Primary Examiner

E. WOODBERRY, Assistant Examiner

U.S. Cl. X.R.

117—148; 161—261; 260—15, 17.3

PO-1050
(5/69)

UNITED STATES PATENT OFFICE
CERTIFICATE OF CORRECTION

Patent No. 3,493,417                    Dated February 3, 1970

Inventor(s) Rolf Erhard Moren and Birger Sundin

It is certified that error appears in the above-identified patent and that said Letters Patent are hereby corrected as shown below:

The identification of the assignees is incorrect. The identification should indicate that the application has been assigned to Stockholms Superfosfat Fabriks Aktiebolag, Stockholm, Sweden, a limited company, and Mo och Domsjo Aktiebolag, Ornskoldsvik, Sweden, a limited company, as joint assignees.

Column 4, line 18, "polyproplyene" should be -- polypropylene --.
Column 4, line 44, "havin ga" should be -- having a --.
Column 4, line 73, "halids" should be -- halide --.

SIGNED AND
SEALED
JUL 21 1970

(SEAL)
Attest:

Edward M. Fletcher, Jr.
Attesting Officer

WILLIAM E. SCHUYLER, JR.
Commissioner of Patents